(12) United States Patent
Byer et al.

(10) Patent No.: US 8,804,147 B2
(45) Date of Patent: Aug. 12, 2014

(54) SEMANTIC PRINTING OPTIONS

(75) Inventors: Scott Byer, Cupertino, CA (US);
Yevgeniy Gutnik, Cupertino, CA (US);
Tyler Odean, San Francisco, CA (US);
Yuri Dolgov, Mountain View, CA (US);
Sanjeev Radhakrishnan, San Jose, CA (US); Paolo Ferraris, Mountain View, CA (US); Marc Pawliger, San Jose, CA (US); Abhijit Kalamkar, Sunnyvale, CA (US); Robert Toscano, San Francisco, CA (US); Albert Bodenhamer, San Jose, CA (US); Akshay Kannan, Fremont, CA (US)

(73) Assignee: Google Inc., Mountain View, CA (US)

( * ) Notice: Subject to any disclaimer, the term of this patent is extended or adjusted under 35 U.S.C. 154(b) by 69 days.

(21) Appl. No.: 13/563,272

(22) Filed: Jul. 31, 2012

(65) Prior Publication Data

US 2014/0036287 A1 Feb. 6, 2014

(51) Int. Cl.
*G06K 15/02* (2006.01)

(52) U.S. Cl.
USPC .......................................... 358/1.13

(58) Field of Classification Search
USPC ............................... 358/1.13, 1.15
See application file for complete search history.

(56) References Cited

U.S. PATENT DOCUMENTS

| 5,828,864 | A | 10/1998 | Danknick et al. |
| 6,453,129 | B1 | 9/2002 | Simpson et al. |
| 7,092,119 | B1 | 8/2006 | Hinds et al. |
| 7,411,690 | B2 | 8/2008 | Tsukada et al. |
| 8,477,350 | B2 | 7/2013 | Jazayeri et al. |
| 2003/0002072 | A1 | 1/2003 | Berkema et al. |
| 2004/0114175 | A1 | 6/2004 | Cherry et al. |
| 2004/0179229 | A1 | 9/2004 | Laughlin |
| 2004/0196491 | A1 | 10/2004 | Uchino |
| 2005/0158100 | A1 | 7/2005 | Yamaguchi |
| 2006/0095500 | A1 | 5/2006 | Kato |
| 2006/0158680 | A1 | 7/2006 | Fujinawa et al. |
| 2007/0086054 | A1 | 4/2007 | Ikeno |
| 2007/0159650 | A1 | 7/2007 | Takamatsu et al. |

(Continued)

FOREIGN PATENT DOCUMENTS

| EP | 1465052 A2 | 10/2004 |
| WO | 2011115987 A2 | 9/2011 |

OTHER PUBLICATIONS

"Server Message Block", from Wikipedia, the free encyclopedia, Aug. 24, 2012, 9 pages.
"Cups", from Wikipedia, the free encyclopedia, Aug. 22, 2012, 10 pages.
"HP and RIM Announce Strategic Alliance to Mobilize Business on BlackBerry", Hewlett-Packard Development Company, L.P., May 4, 2009, 3 pages.

(Continued)

*Primary Examiner* — Qian Yang
(74) *Attorney, Agent, or Firm* — Brake Hughes Bellermann LLP

(57) ABSTRACT

The embodiments provide a print server including a cloud print service. The print server includes an application manager configured to receive a print request for content to be printed, over a network, from a user of an application associated with a device, and provide, over the network, a print dialog to the user. The print dialog is configured to identify at least one available printer associated with the cloud print service. The print server also includes an options translator configured to determine at least one printing option associated with the at least one available printer, and translate a native printer display format of the at least one printing option to a common protocol display format associated with the cloud print service. The options translator is configured to provide the common protocol display format for inclusion in the print dialog.

19 Claims, 6 Drawing Sheets

(56) References Cited

U.S. PATENT DOCUMENTS

| | | | |
|---|---|---|---|
| 2007/0253020 A1 | 11/2007 | Hull et al. | |
| 2008/0137121 A1 | 6/2008 | Chrisop et al. | |
| 2008/0180724 A1 | 7/2008 | Selvaraj | |
| 2009/0240737 A1* | 9/2009 | Hardisty et al. | 707/200 |
| 2009/0276266 A1 | 11/2009 | Nishiyama | |
| 2009/0287806 A1 | 11/2009 | Hamilton et al. | |
| 2010/0014114 A1 | 1/2010 | Oosawa | |
| 2010/0027060 A1* | 2/2010 | Ogino et al. | 358/1.15 |
| 2010/0073707 A1 | 3/2010 | Ferlitsch | |
| 2010/0302579 A1 | 12/2010 | Nuggehalli et al. | |
| 2010/0302587 A1 | 12/2010 | Kawabata et al. | |
| 2010/0309508 A1 | 12/2010 | Kamath et al. | |
| 2010/0328707 A1 | 12/2010 | Miyake | |
| 2011/0075164 A1 | 3/2011 | Nordback | |
| 2011/0096354 A1 | 4/2011 | Liu | |
| 2011/0128574 A1 | 6/2011 | Kouno | |
| 2011/0222104 A1 | 9/2011 | Mohammad et al. | |
| 2011/0235085 A1 | 9/2011 | Jazayeri et al. | |
| 2011/0242554 A1 | 10/2011 | Farry et al. | |
| 2011/0279863 A1 | 11/2011 | Chang et al. | |
| 2011/0299110 A1 | 12/2011 | Jazayeri et al. | |
| 2012/0044525 A1* | 2/2012 | Okamura et al. | 358/1.15 |
| 2012/0057193 A1 | 3/2012 | Jazayeri | |
| 2012/0072376 A1 | 3/2012 | Akiyama et al. | |
| 2012/0075665 A1 | 3/2012 | Sambe | |
| 2013/0188218 A1 | 7/2013 | Rajesh | |

OTHER PUBLICATIONS

Ray, "HP Cloud Print: 100% and Absolutely Revolutionary", Aug. 21, 2007, 3 pages.

"Introducing ePrint", ePrintCenter, Hewlett-Packard Development Company, L.P., 2012, 1 page.

"Internet Printing Protocol". from Wikipedia, Dec. 29, 2011, 3 pages.

"Print Server", from Wikipedia, the free encyclopedia, Jul. 31, 2012, 2 pages.

Search Report and Written Opinion for International Application No. PCT/US2011/028512, mailed Jun. 9, 2011, 13 pages.

Bhatti, et al., "Cloud-Based Printing for Mobile Devices", Proceedings of the SPIE, vol. 7540, 2010, pp. 75400A-75400A-8.

Non-Final Office Action for U.S. Appl. No. 12/725,067, mailed Sep. 27, 2012, 17 pages.

Non-Final Office Action for U.S. Appl. No. 13/563,266, mailed Dec. 30, 2013, 20 pages.

Notice of Allowance for U.S. Appl. No. 13/563,276, mailed Dec. 20, 2013, 17 pages.

Non-Final Office Action for U.S. Appl. No. 13/563,281, mailed Jan. 6, 2014, 20 pages.

Search Report and Written Opinion for International Application No. PCT/US2013/052689, mailed Dec. 9, 2013, 8 pages.

Final Office Action for U.S. Appl. No. 13/563,266, mailed Apr. 9, 2014, 22 pages.

* cited by examiner

SEMANTIC PRINTING OPTIONS

TECHNICAL FIELD

This description relates to a cloud print service.

BACKGROUND

An ability to print within a computing environment generally ranges from desirable to indispensable. Conventional printers, and associated printing techniques, typically involve installation of a print driver within the context of an operating system or platform of an associated computer. The print driver is generally specific to the associated (type of) printer, and to the operating system, and enables applications running in the context of the operating system to communicate with (e.g., send print jobs to) the printer. Thus, in an example user experience, an owner of a computer running a particular operating system purchases a printer, and then installs a version of the printer driver associated with the user's operating system onto the computer. In other example scenarios, a printer (i.e., associated printer driver) may be installed in the context of a network.

In either case, the printer driver may include a capability file that specifies the capabilities of the printer such as double-sided printing, separator pages, color or image quality options, and/or staples, for example. Typically, all or a portion of the capabilities of a printer are presented as printing options in a print dialog, depending on the application providing the print dialog. For example, a user may wish to print a certain document and select a print option from a drop-down menu, for example. In response, the user may receive a print dialog providing one or more printers that are connected to the computer either locally or via the network. Further, the print dialog may include a number of different printing options associated with each printer. The display format of the printing options for a particular printer is determined from its respective capability file, which is determined by the printer's vendor. As such, the same printing option may be displayed in the print dialog according to a number of different formats because the format is determined by each individual vendor.

In one example, regarding a resolution printing option, the print capability file for a first printer may specify the display format as a selection between "high" and "low", and the print capability file for a second printer may specify the display format as a selection between "600×600" and "300×300." In another example, with respect to page orientation, the print capability file for the first printer may specify the display format as a selection between "portrait" and "landscape", and the print capability file for a second printer may specify the display format as a selection between "vertical" and "horizontal."

In contrast to conventional print paradigms, a cloud printing system may provide users with an ability to print content from virtually any application or device, e.g., using any cloud-aware printer. In other words, the cloud printing system may provide an ability for virtually any application running on any device within a network to communicate with a cloud print service, to thereby print to any printer that is also in communication with the cloud print service. In one example, in the context of cloud printing, an application may send a print request, over a network, to the cloud print server for printing a document using the cloud print service. In return, the cloud print server may provide a print dialog including a number of available cloud-printers, as well as printing options associated with each available cloud-aware printer. Upon selection of a printer and the print options, the cloud print service may convert the print job to a format suitable for the cloud-aware printer, and then transmit the print job having the converted format, over the network, to the cloud aware printer.

However, understanding and incorporating the various different display formats of printing options provided by individual vendors of printers into a cloud-based print service may be difficult and challenging. For example, rendering a user-friendly print dialog having a uniform set of printing options for a relatively large number of cloud aware printers in the cloud environment presents its own set of challenges that are not encountered in conventional print paradigms.

SUMMARY

The details of one or more implementations are set forth in the accompanying drawings and the description below. Other features will be apparent from the description and drawings, and from the claims.

The embodiments provide a print server including a cloud print service. The print server includes an application manager configured to receive a print request for content to be printed, over a network, from a user of an application associated with a device, and provide, over the network, a print dialog to the user. The print dialog is configured to identify at least one available printer associated with the cloud print service. The print server also includes an options translator configured to determine at least one printing option associated with the at least one available printer, and translate a native printer display format of the at least one printing option to a common protocol display format associated with the cloud print service. The options translator is configured to provide the common protocol display format for inclusion in the print dialog.

According to an embodiment, the options translator configured to determine at least one printing option may include determining the at least one printing option from printer capability information associated with the at least one available printer in response to receipt of the print request.

The options translator configured to determine at least one printing option associated with the at least one available printer may include locating a capability name corresponding to the at least one printing option from the printer capability information. The option translator configured to translate a native printer display format of the at least one printing option to a common protocol display format associated with the cloud print service may includes disregarding the native print display format of the at least one printing option contained in the printer capability information and selecting the common protocol display format associated with the cloud print service from a translation database based on the capability name.

The print server may further include a printer searcher configured to search a plurality of available printers associated with the cloud print service based on print search criteria, and configured to select at least a subset of available printers including the at least one available printer among the plurality of available printers having the at least one printing option. The options translator may be configured to translate the native printer display format of the at least one printing option for at least one printer among the selected subset to the common protocol display format associated with the cloud print service.

According to one aspect, the common protocol display format may be a display format that is the same for each printer having the at least one printing option.

The options translator configured to translate a native printer display format of the at least one printing option to a common protocol display format associated with the cloud print service may include locating a capability name corresponding to the at least one printing option in a translation database and selecting the common protocol display format from the translation database corresponding to the capability name.

The options translator configured to translate a native printer display format of the at least one printing option to a common protocol display format associated with the cloud print service may further include providing the common protocol display format in a language associated with the user.

According to an embodiment, the providing the common protocol display format in a language associated with the user may include determining the language associated with the user, locating a capability name corresponding to the at least one printing option in a translation database and selecting the language of the common protocol display format from the translation database based on the determined language.

The determining the language associated with the user may include determining the language based on a user account of the user associated with the cloud print service. Also, the determining the language associated with the user may include determining the language based on an internet protocol (IP) address associated with the request.

The print server may include a print preview generator configured to access the content in response to the print request and generate a print preview providing at least a portion of the content displayed in accordance with the at least one printing option having the common protocol display format. The print preview generator may be configured to provide the print preview along with the at least one printing option having the common protocol display format for inclusion in the print dialog.

The embodiments also provide a method of translating printing options into a common protocol display format performed by one or more processors. The method includes receiving a print request for content to be printed, over a network, from a user of an application associated with a device, and providing, over the network, a print dialog to the user. The print dialog may be configured to identify at least one available printer associated with the cloud print service. The method further includes determining at least one printing option associated with the at least one available printer, translating a native printer display format of the at least one printing option to the common protocol display format associated with the cloud print service and providing the common protocol display format for inclusion in the print dialog.

The determining at least one printing option associated with the at least one available printer may include determining the at least one printing option from printer capability information associated with the at least one available printer in response to receipt of the print request.

The determining at least one printing option associated with the at least one available printer may include locating a capability name corresponding to the at least one printing option from the printer capability information. The translating a native printer display format of the at least one printing option to the common protocol display format associated with the cloud print service may include disregarding the native print display format of the at least one printing option contained in the printer capability information and selecting the common protocol display format associated with the cloud print service from a translation database based on the capability name.

The common protocol display format may be a display format that is the same for each printer having the at least one printing option.

The translating a native printer display format of the at least one printing option to the common protocol display format associated with the cloud print service may include providing the common protocol display format in a language associated with the user.

The providing the common protocol display format in a language associated with the user may include determining the language associated with the user, locating a capability name corresponding to the at least one printing option in a translation database and selecting the language of the common protocol display format from the translation database based on the determined language.

The embodiments provide a computer program product tangibly embodied on a non-transitory computer-readable storage medium and including executable code that, when executed, is configured to cause a data processing apparatus to receive a print request for content to be printed, over a network, from a user of an application associated with a device, and provide, over the network, a print dialog to the user. The print dialog is configured to identify at least one available printer associated with the cloud print service. Also, the executable code, that when executed, is configured to cause the data processing apparatus to determine at least one printing option associated with the at least one available printer, translate a native printer display format of the at least one printing option to the common protocol display format associated with the cloud print service, and provide the common protocol display format for inclusion in the print dialog.

The executable code that, when executed, is configured to cause a data processing apparatus to determine the at least one printing option from printer capability information associated with the at least one available printer in response to receipt of the print request.

The executable code that, when executed, is configured to cause a data processing apparatus to locate a capability name corresponding to the at least one printing option from the printer capability information, disregard the native print display format of the at least one printing option contained in the printer capability information, and select the common protocol display format associated with the cloud print service from a translation database based on the capability name.

DETAILED DESCRIPTION

Figure 1:
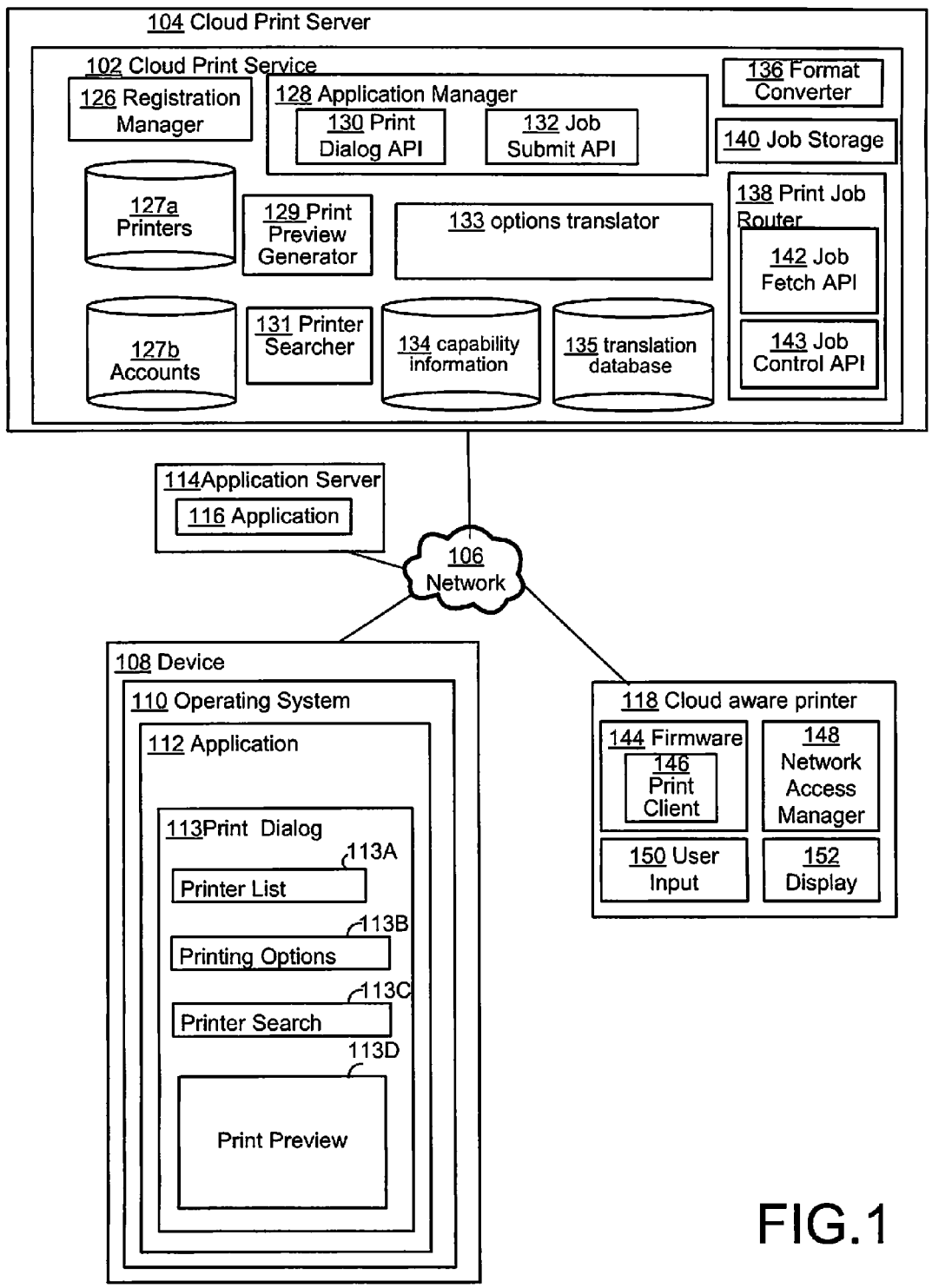
FIG. 1 is a block diagram of a system for translating printing options into a common protocol display format using a cloud print service according to an embodiment.

FIG. 1 is a block diagram of a system for translating printing options from a native printer display format to a common protocol display format using a cloud print service 102. As shown in the example of FIG. 1, the cloud print service 102 may be executed on a cloud print server 104 which provides printing capabilities over a network 106. As described in detail below, the cloud print service 102 therefore provides a user with a uniform printing experience which is platform-independent and which unburdens the user of the need to configure, update, or otherwise maintain or oversee printer operations. Moreover, as also described herein in further detail, the cloud print server 104 may determine printing options associated with the available cloud-based printers, and translate the native printer display format of the printing options to a common protocol display format.

The common protocol display format of the printing options may be provided in a print dialog to the user and/or used within a printer searching functionality for searching cloud-based printers. The native printer display format for a particular printing option may be the display format provided by the individual vendor of the printer. However, as indicated above, multiple display formats may exist for the same printing option. As such, the cloud print server 104 may translate the native printer display format of the printing options into the common protocol display format.

The common protocol display format may be a display format that is uniform across all cloud-aware printers. Also, the common protocol display format permits the cloud print server 104 to search the number of different printers associated with the cloud print service 102 in a reliable and consistent manner, and provides a uniform and user-friendly print preview of the document subject to the print request. Various other features and advantages of the cloud print service 102 and the printing options translation are described in detail below, and/or would be apparent.

In FIG. 1, a device 108 is illustrated as an example of virtually any computing device from which a user may wish to execute a print job. By way of non-limiting example, then, the device 108 may include a laptop or desktop computer, a netbook, a tablet computer, a smartphone, a camera, or any device which may store or have access to content which the user may desire to print.

In the example of FIG. 1, an operating system 110 is illustrated as executing an application 112. Again, these elements are included by way of illustration and example, and may include virtually any operating system or other platform on which virtually any application may run. For example, the operating system 110 may include operating systems such as the Windows operating system, Mac OS, or Linux, and may include mobile platforms such as Android, Symbian, or iPhone OS, to name a few examples. In other examples, the operating system 110 may include a browser-based operating system, such as the Chrome OS.

Consequently, the application 112 may include virtually any application which may run on any underlying operating system or platform. Examples of such applications are well-known and too numerous to mention in any detail, but generally include document processing applications, email applications, image editing or presentation software, a web browser, or virtually any application which provides the user with a rendering of data content which the user may wish to print.

In particular, the application 112 may represent a web application which executes on a remote application server 114 as application 116. That is, the application 116 may include any application functionality which is accessed by the user over the network 106 and experienced locally as the application 112, e.g., using a browser running at the device 108. As is known, such web applications allow an owner of the application server 114 to assume responsibility for installing, configuring, executing, and maintaining the application 116 at the application server 114, so that the user of the device 108 may obtain the benefit of the application 116 without many or any of the associated costs and responsibilities. Techniques for executing such a web application, and related technology, are well known in the art and are therefore not described further in detail herein, except as may be helpful or necessary to understand operations of the system of FIG. 1.

The network 106 may thus represent, for example, the public Internet or other wide area public or private network. The network 106 may represent, in further examples, a corporate or other intranet, and/or a smaller-scale, local or personal network, any of which may be implemented using standard network technology.

Further in FIG. 1, a cloud-aware printer 118 is illustrated which is configured to communicate with the cloud print service 102 over the network 106. In this regard, the term "cloud" or "cloud-aware" references the use of "cloud computing," which, generally speaking, includes a style of computing in which computing resources such as application programs and file storage are remotely provided over a network such as the Internet, typically through a web browser. For example, many web browsers are capable of running applications, which can themselves be application programming interfaces ("API's") to more sophisticated applications running on remote servers. In the cloud computing paradigm, a web browser interfaces with and controls an application program that is running on a remote server. Through the browser, the user can create, edit, save and delete files on the remote server via the remote application program. Thus, it may be observed that the application server 114 and associated application 116 may also represent examples of cloud computing. Although only one cloud aware printer 118 is illustrated in FIG. 1, the example embodiments encompass any number of cloud aware printers using the system of FIG. 1.

In the context of the cloud-aware printer 118, the cloud print service 102 enables the application 112 to print directly to the cloud-aware printer 118, without a requirement or need for (e.g., independently of), involvement of the operating system 110. In other words, the application 112 may communicate directly with the cloud print service 102 to thereby print to the cloud-aware printer 118, without e.g., requiring a local driver within the operating system 110. As a result, virtually any application 112 that may be configured to communicate with the cloud print service 118 may make use of the cloud-aware printer 118, as described in detail, below.

For example, the cloud print service 102 may be configured to register the user and/or the device 108, as well as the cloud-aware printer 118, or any other printer capable of using the system of FIG. 1. In a specific example, the device may be a smartphone, and the user may use the application 112 to purchase a ticket (e.g., a movie ticket, or an airline ticket). Then, the user may print the purchased ticket directly to the cloud-aware printer 118, even though the device 108 and/or the operating system 110 may not have the resources, or otherwise be configured, to support native printing in a conventional sense (e.g., may not currently be executing a print driver of any sort associated with the cloud-aware printer 118). In this way, the user of the application 112 may be provided with a print option and associated abilities that are not currently provided in conventional printing paradigms and techniques. Many other such examples are described herein, or would be apparent.

The cloud-aware printer 118 may be contrasted with a legacy printer, not specifically illustrated in FIG. 1, which does not natively support communication with the cloud print service 102. When using such a legacy printer, a separate device and/or software may be utilized to impart the advantages of the cloud print service 102 to the legacy printer. It will be appreciated that all the various features and functions of the cloud-aware printer 118 may be obtained through the use of a legacy printer supplemented with appropriate hardware/software support.

In short, the system provides an ability for virtually any application running on any device within the network 106 (e.g., the applications 112, 116 and device 108) to communicate with the cloud print service 102 to thereby print to any printer which is also in (direct or indirect) communication with the cloud print service 102. Consequently, users may benefit from increased printing options and abilities, and experience an overall decrease in the costs and efforts associated with doing so. Meanwhile, printer manufacturers may experience a decreased or eliminated need to provide users with the (updated) driver(s) and other prerequisites for users to fully experience the benefits of their products. This may result in, for example, higher customer satisfaction, and a decreased cost of producing and maintaining printers.

In particular, as referenced above, the system may provide a number of enhanced features and functions related to the translation of printing options into a common protocol display format in order to impart understanding of the numerous different printing options to the cloud print service 102, thereby facilitating the searching of available printers by printing options, as well as providing a uniform printing option display regardless of the differences between display formats provided by the individual vendors for the same printing option. Further, the uniform printing option display format may be provided in a print dialog in conjunction with a print preview of the document such that the user experience of rendering a print job is simplified and intuitive. According to the embodiments, the printing options that are understood by the cloud print service 102 and translated into the common protocol display format may be considered semantically supported and may be referred to as semantic printing options.

Referring to FIG. 1, the application 112 may provide a print dialog 113 in conjunction with the cloud print service 102. The print dialog 113 includes a printer list 113A identifying a number of printers including the cloud-aware printer 118, the legacy printer, as well as any other available cloud aware printer that is associated with a user account. For example, the printer list 113A may include the entire list of printers associated with the user account of the user for cloud printing. For example, the entire list of printers includes the cloud-aware printer 118 and/or the legacy printer, as well as other cloud-aware printers 118 and/or legacy printers that are associated with the cloud print service 102. In one example, the entire list of printers include the printers that are registered with the cloud print service 102 for a particular user as well as publically-available printers that have registered with the cloud print service 102. The publically available printers may include printers that located at a business (e.g., coffee shops, printing centers, ect.) that may charge a fee for printing.

Further, the print dialog 113 may include one or more printing options 113B corresponding to each of the printers in the printer list 113A. According to the embodiments, the one or more printing options 113B may be provided in the print dialog 113 according to the common protocol display format. For example, instead of providing the vendor-specific language that describes the printing options, the cloud print service 102 translates the printing options from the native printer display format of a respective cloud aware printer 118 to the common protocol display format associated with the cloud print service 102, and provides the translated printing options 113B in the print dialog 113.

The print dialog 113 may include a printer search box 113C that permits the user to enter one or more search terms in order to obtain a desired printer. For example, the user may enter a search term such as a particular printing option or capability (e.g., color printing), which, in return, would narrow the printer list 113A to cloud-aware printers 118 meeting the search criteria. In particular, the cloud print service 102 may leverage the common protocol display format of the printing options in order to more accurately search the number of available printers associated with the cloud print service 102, as explained in more detail later in the disclosure.

The print dialog 113 may include a print preview 113D, which provides the user a representation of the content to be printed. According to one embodiment, the print preview 113D may be arranged according to the selected printing options. For example, a user may desire to print a document using the application 112. The application 112 may transmit a print request to the cloud print service 102, and in return, the application 112 may receive the print dialog 113 with the printer list 113A, the printing options 113B, the printer search box 113C, and the print preview 113D. One or more of the printing options 113B may be pre-selected by the cloud print service 102 or selected according to the user's preferences, in which the print preview 113D provides a representation of the contents to be printed according to the selected printing options. Also, the user may change or adjust any of the printing options 113B via any type of user control such as radio buttons, for example. The print preview 113D may display the contents to be printed or a portion thereof as a print preview display according to the selected printing options.

Referring to FIG. 1, the cloud print server 102 may include a number of example components or modules which may be utilized to implement functionalities of the cloud print service 102, and, in particular, may be utilized to implement the concepts and features related to the translation of printing options from the native printer display format to the common protocol display format. The cloud print service 102 may include a registration manager 126, which may be configured to register printers and users. The registration manager 126 may be configured to receive a registration of the cloud-aware printer 118 and/or the legacy printer, including storing identification information therefore within a data store 127a of registered printers. Similarly, the registration manager 126 may be configured to register a user(s) who may currently or potentially wish to execute print jobs using the cloud print service 102, and to store identification information for such users within a data store 127b of registered users.

There are many examples scenarios and techniques by which users and/or printers may come to be registered with the cloud print server 102 though the registration manager 126. In general, for example, a user of the device 108 may use a browser to visit a website associated with the cloud print service 102, and may enter a username/password combination to establish a user account with the cloud print service 102. In some examples, users already may have a user account with a separate and possibly related service or service provider. For example, various online services (e.g., other cloud-based computing resources) may provide functionalities such as email, data storage, and document processing, and, in such cases, the user may already have a secure user account established in connection therewith. In such cases, the cloud print service 102 may leverage or access such existing user accounts, e.g., to avoid a need to create a new user account, and to facilitate access of existing users of other services with the cloud print service 102, such as, e.g., for implementation of the printer-sharing techniques just described.

In addition, the registration manager 126 may be configured to receive capability information (e.g., capability files) with respect to the capabilities of a printer at the time of registering with the cloud print service 102. The capability information may indicate the capabilities of a particular printer, and provide the details on how the printer options are displayed according to its native display format. The capability information may be expressed in XML Paper Specification (XPS) or PostScript Printer Description (PPD) depending on the type of operating system 110. For example, Window-based operating systems may use the XPS format, whereas Linux or Mac-based operating systems may use the PPD format. XPS files or PPD files are files created by vendors to describe the entire set of features and capabilities available for a particular printer. The registration manager 126 may store the capability information (e.g., XPS files or the PPD files) in a capability information database 134. A portion of an XPS capability file is illustrated with respect to FIG. 2, which is described later in the disclosure. Also, it is noted that the embodiment encompass any type of method for receiving capability files besides the registration process. For example, the cloud print service 102 may receive capability files via an application manager 128 as further described below.

It may be appreciated that although the registration manager 126 is illustrated as being included within the cloud print service 102, it also may occur that some or all functionality related to the registration manager 126 may exist externally to the cloud print service 102. For example, the application server 114 may provide an email application as the application 116, and a user of the device 108 may be registered with this email application (service). In such a case, the application server 114 may have the responsibility of maintaining the user's account, and the cloud print service 102 may simply interface with the application server 114 and provide access to the user once the user is logged on into the application 116.

Further in FIG. 1, an application manager 128 may be configured to communicate with any application which may be desired to be used for printing within the system of FIG. 1, including, e.g., the application 112, and the application 116. Thus, for example, the application manager 128 may implement various application programming interfaces (APIs) which enable such communication with external applications. For example, the application manager 128 may include a print dialog API 130, which may be configured to render the print dialog 113 including the printer list 113A, the printing options 113B, the printer search box 113C, and well as the print preview 113D. A job submit API 132 may be utilized to receive the identification of application content submitted by the user by way of the print dialog 113. The job submit API 132 may be configured to submit a corresponding print job, including application content to be printed and associated selected printing options, to a format converter 136, which may be configured to execute a conversion of the print job into a format which is consistent and compatible with the cloud-aware printer 118. The application manager 128 may communicate with the application 112, 116 (or other application) in a format that is independent of a specific printer, e.g., that is generic with respect to all available or relevant printers within the system.

As indicated above, the application manager 128 may receive a print request over the network 106 from a user of the application 112, 114, and provide the print dialog 113, over the network 106, to the user. Also, according to an embodiment, an options translator 133 is configured to determine one or more printing options associated with the available cloud aware printers 118, and translate the native printer display format of the printing options to the common protocol display format associated with the cloud print service 102. For example, the options translator 133 may determine the printing options from the capability files in the capability information database 134. As indicated above, the capability files may include information created by vendors to describe the entire set of features and capabilities available for a particular printer. Based on the capability files in the capability information database 134, the options translator 133 may determine a set of printing options for the available cloud-aware printers 118 in response to receipt of the print request.

Generally, the options translator 133 may translate the native printer display format of the printing options associated with the available cloud aware printers 118 into the common protocol display format associated with the cloud print service 102. For example, the options translator 133 may locate capabilities of the cloud aware printers 118 from the capability files stored in the capability information database 134. In one embodiment, the options translator 133 may search the capability files in the capability information database 134 and locate capability names, which may represent the capabilities of the printers. Also, the capability files may define the display of the capabilities such as the display name, and the display and/or arrangement of printing options, which are defined by the individual vendors. According to an embodiment, the options translator 133 may disregard the native print display format of the printing options provided in the capability files, and select the common protocol display format associated with the cloud print service from a translation database 135.

The translation database 135 may store the common protocol display format associated with each capability. For example, for each capability, the translation database 135 may store a corresponding common protocol display format, which may be a common description for a particular printing option. In other words, for a particular printing option (e.g., page resolution), the common protocol display format may be a display format for the printing option that is the same for each printer having the page resolution printing option. Therefore, regardless of the vendor-specific language description, the printing options may be provided to the user in a uniform manner. In addition, the translation database 135 may provide a translation of the common protocol display format in a number of different languages, as further described below.

Instead of using the native display format of the printing options, the options translator 133 may search the translation database 135 for the capabilities provided by the capability information database 134, and locate the corresponding common protocol display format for the appropriate printing options. In addition, options translator 133 may determine the language associated with the user, locate the capability names corresponding to the printing options in the translation database 135, and provide the common protocol display format for the printing options in the determined language. For example, the options translator 133 may determine the language of the user based on the user's account from the database 127*b* of registered users. Also, the options translator 133 may determine the language based on the internet protocol (IP) address associated with the print request. Further, it is noted that the embodiments encompass any known mechanism that may identify a location of the user.

Figure 2:
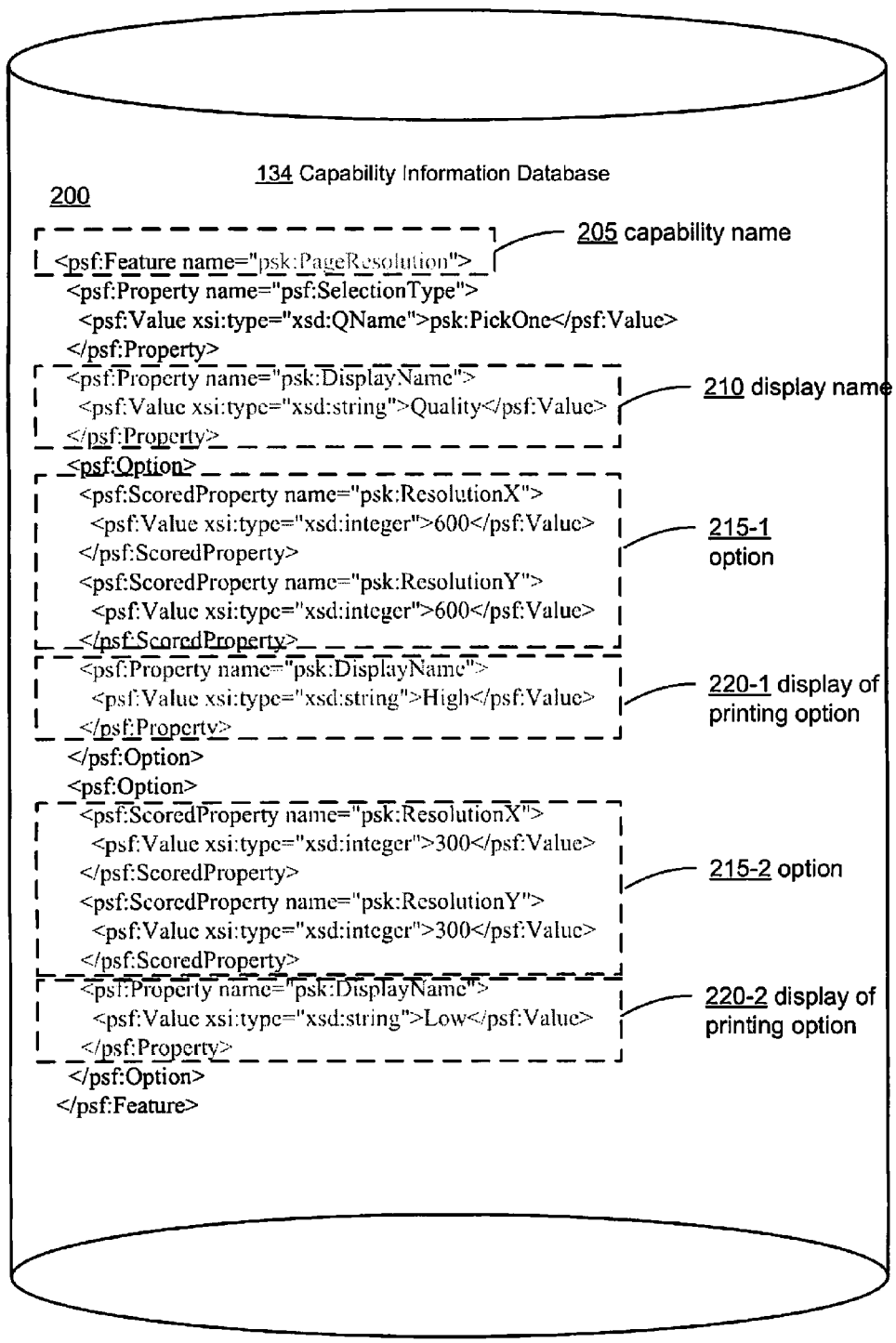
FIG. 2 illustrates a portion of a capability file according to an embodiment.

FIG. 2 illustrates a portion of a capability file 200 stored in the capability information database 134 according to an embodiment. In the particular example of FIG. 2, the portion of the capability file 200 is in the XPS format, and is related to the page resolution printing option. However, in reality, the capability file for a particular printer may be relatively larger than the portion illustrated in FIG. 2, and include capability information for a number of capabilities.

For example, the capability file may include a number of capability names such as capability name 205, which may be the name of the capability defined by XPS. In other words, regardless of the specific-vendor language, the capability file typically identifies capabilities by capability names, which is the same across all XPS-printers. Similarly, a PPD capability file identifies capabilities by capability names, which is the same across all PPD-printers. The options translator 133 supports translating printing options from capabilities files in either the XPS or PPD formats, as well as any other type of capability standard. In this example, the capability name 200 is identified by the string "psk:PageResolution", which may be fixed and defined by the XPS standard. The capability name 200 "psk:PageResolution" relates to the printing resolution of the printer. Also, the portion of the capability file 200 includes the display name 210 of the capability, and the display names 220-1, 220-2 of the printing options 215-1, 215-2, which is in the native printer display format. In other words, the display name 210 of the capability and the display names 220-1, 220-2 of the printing options 215-1, 215-2 are defined by the particular vendor of the printer associated with the portion of the capability file 200. According to an embodiment, the options translator 133 ignores the native printer display format of the capability (e.g., the display name 210 of the capability and the display names 220-1, 220-2 of the printing options 215-1, 215-2), and obtains a common protocol display format for the capability name 205 for inclusion in the print dialog 113 from a translation database 135, which is further described below.

In the example of FIG. 2, the display name 210 of the capability name 200 is "Quality", which is defined by the native printer display format provided by the vendor. For example, the vendor has defined that the capability of page resolution is displayed as "Quality," which is not the typical name usually provided for the page resolution capability in the United States. Typically, the display name for the page resolution printing option is Resolution. However, it is noted that that a vendor may provide any type of description for the display name of a capability. According to an embodiment, the options translator 133 disregards the display name 210 provided in the portion of the capability file 200, and uses the common protocol display format obtained from the translation database 135.

The portion of the capability file 200 also includes information that defines the printing options 215 for the capability name 205. The options translator 133 is configured to semantically understand the printing options 215 associated with the capability name 205, and instead of providing the display 220 in the native printer display format, the options translator 133 provides the common protocol display format. In this example, the capability of page resolution provides two printing options 215—printing option 215-1 and printing option 215-2. The printing option 215-1 corresponds to a page resolution of 600×600 and the printing option 215-2 corresponds to a page resolution of 300×300. According to the native printer display format, the printing option 215 is displayed as "High" 220-1 and "Low" 220-2. It is noted that vendors may use a number of different descriptions for the display of the page resolution printing option. For example, another vendor may display the actual values of 600×600 and 300×300. As such, the display 220-1 would include "xsd:string">600× 600</psf:Value" and the display 220-2 would include "xsd: string">600×600</psf:Value." According to the embodiments, instead of using the native printer display format provided by the display 220, which may encompass several different variations for displaying the page resolution printing option, the options translator 133 may ignore the values provided by the display 220, and use a uniform name that is independent of the descriptions provided by the vendor. It may be appreciated that the above example is merely one example of hundreds of possible printing options, in which the options translator 133 may ignore the native printer display format and provide a uniform name that is independent of the descriptions provided in the capability files. In other example, with respect to page orientation, a vendor may provide display names "vertical" and "horizontal." However, according to an embodiment, the options translator 133 may ignore these display names, and provide a uniform name independent of the vendor-specific language.

The cloud print service 102 may semantically support any number and type of printing options such as page resolution, duplex printing (e.g., long-side, short-side), page range, page orientation, size, type of paper, options for color rendering, staples or no staples, split sheet capability, option for bypass tray to put cards, cover inserter, color brightness, page order being forward or reverse, lines per inch in the document being a range from 300 to 1800 and more specifically 300, 600, 1200 and 1800 lines per inch, job fonts, glossy adjust and gradation smoothing for quality of printing, ink separation, screening parameters for quality of printing, color matching, folding, binding, collating, booklet making, slip sheet, drilling, and trimming for job finishing. These options constitute broad capabilities for printing such as job layout, job definition, job quality, job content, job description, job color, job imposition and job finishing.

Figure 3:
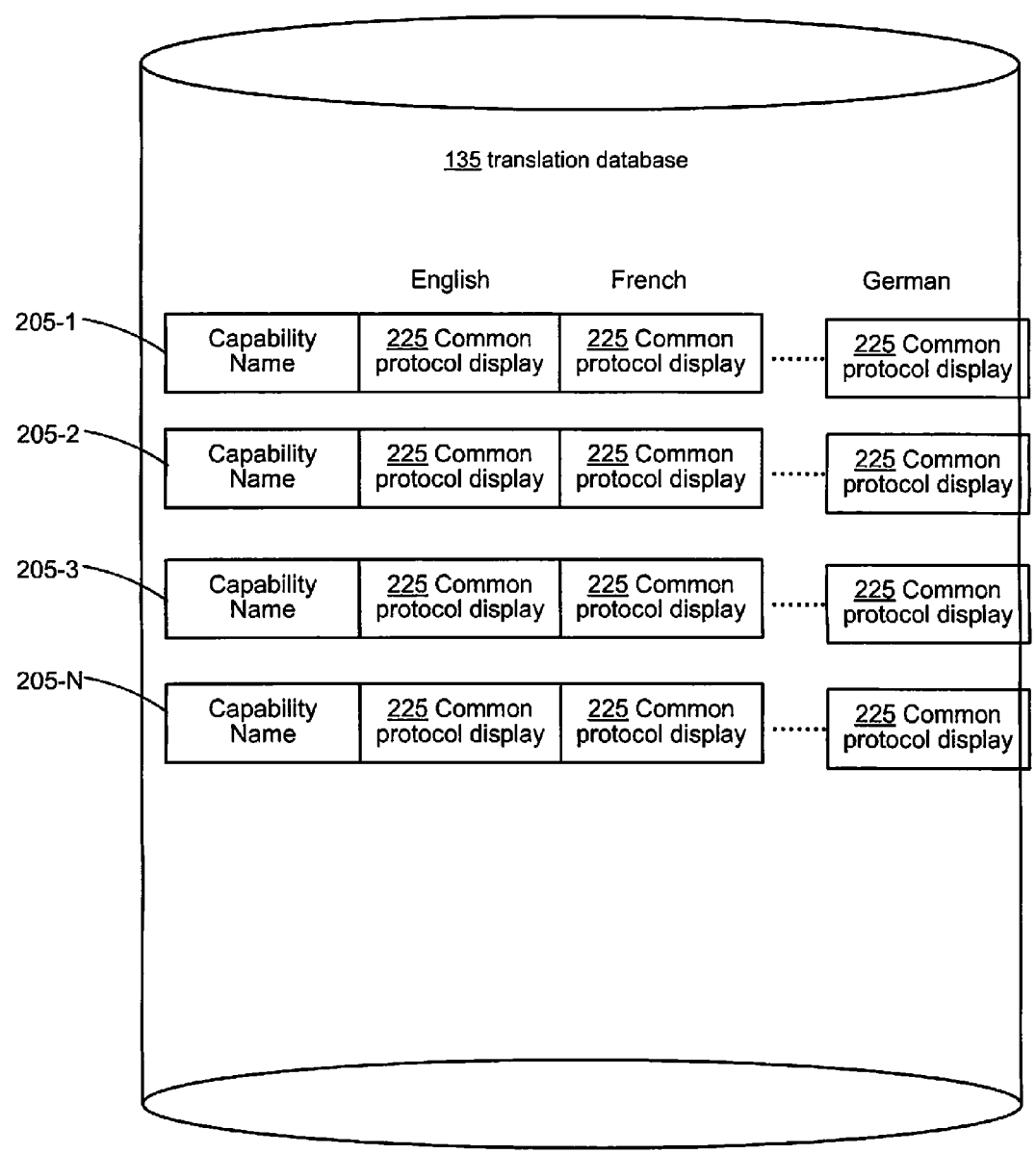
FIG. 3 illustrates a translation database of the system of FIG. 1 according to an embodiment.

FIG. 3 illustrates the translation database 135 according to an embodiment. The translation database 135 may include information that associates capabilities with the common protocol display format 225. In addition, the translation database 135 may provide the common protocol display format in a number of different languages. As such, depending on a location associated with a user of the device 108, the options translator 133 may obtain the common protocol display format associated with the printing option, and provide the common protocol display format in a language associated with the user. Referring to FIG. 3, the translation database 135 may include a number of capabilities, which are identified by the capability names 205-1 to 205-N. Similar to the portion of the capability file 200 of FIG. 2, the capability names refer to the capability defined by the standard such as PPD or XPS. The capability names 205-205-N may represent the entire list of possible capability names associated with printers or a portion thereof. For each capability name 205, the translation database 135 may provide the common protocol display name 225 for a number of different languages such as English, French, German, and/or any other supported language.

Although the translation database 135, the capability information database 134, and the data store 127a of registered printers, are illustrated as separate databases, the embodiments encompass any number of database (including one database) for storing information related to the features, characteristics, capabilities, and/or display formats of printers and their associated printing options.

Referring back to FIG. 1, the cloud print service may include a printer searcher 131, which may receive or otherwise determine printer search criteria, e.g., specified through the user of the printer search box 113C as referenced above, and which executes a search of available printers meeting the printer search criteria. For example, the printer searcher 131 may search the capability files from the capability information database 134 and/or any other database storing printer characteristics. As described herein, or as would be apparent, such capabilities or characteristics may be specific to a given printer, or may be specific to the user account of the user in question.

In one example, the user may enter search information in the print search box 113C that describes a certain printer capability. For example, the user may enter terms such as "color" or "two-sided printing" in the printer search box 113C. Then, cloud print service 102 may receive this information, over the network 106, via the application manger 128. The printer search 131 may determine the print search criteria based on the user's inputted search terms, and search the capability/printer characteristics information in order to locate one or more printers meeting such the print search criteria. Then, the options translator 133 may translate the native printer display format of the printing options for the printers meeting the print search criteria into the common protocol display format associated with the cloud print service 102, and provide the updated list of printers and associated printing options for inclusion in the print dialog 113.

The cloud print service 102 may also include a print preview generator 129 for generating a print preview in response to the print request. For example, the print preview generator 129 may access the contents subject to the print request and generate a print preview providing at least a portion of the contents display in accordance with the printing options having the common protocol display format. In response to the print request, the contents may be uploaded from the application 112, 116 to the cloud print service 102 via the network 106. For example, if the contents are associated with the user on the application-side, the print preview generator 129 may access the contents to be printed by uploading the document from the application 112, 116 to the cloud print service 102. Also, the print preview generator 129 may access the contents from any other server or network element that stores the document to be printed. For example, the user may have an associated email account that support document editing and management functionalities. As such, in this case, the print preview generator 129 may access the contents of the document from the appropriate server that stores the document subject to the print request.

The print preview generator 129 may generate the print preview based on the accessed contents and the selected printing options having the common protocol display format. For example, the options translator 133 may translate the native printer display format of the printing options into the common protocol display format, and generate the print preview such that the displayed contents of the print preview are arranged according to the printing options having the common protocol display format. In one particular example, if the selected printing option includes a landscape orientation, the print preview generator 129 generates the print preview such that the displayed contents of the print preview have the landscape orientation. The print preview generator 129 may provide the generated print preview for inclusion in the print dialog 113. For example, the application manager 129 via the appropriate APA may transmit the print preview, over the network 106, to the application 112, 116 for display in the print dialog 113.

The print jobs received at the application manager 128 may be passed to the format converter 136, which may be configured to receive the print job and facilitate or execute conversion of the print job into a format associated with the designated (type of) printer for the print job in question. Such conversion may thus generally include, as needed, conversion of the print data itself, as well as conversion of the print characteristics specified in conjunction with the given print job.

In more detail, as is known, printers generally require low-level, device or type-specific instructions which provide a base by which printers actually apply ink to paper to achieve a desired appearance. Such instructions may therefore include very specific portrayals of the desired print outcome using, e.g., a page description language (PDL). For example, the language postscript may be used to describe a desired print outcome, which may then be rendered (e.g., or rasterized) by a specific printer using a print text or images. Additionally, fixed-layout document formats exist which are designed to facilitate device-independent printing all maintaining documents available. For example, the portable document format (PDF) is an example of such format, where .PDF documents may be generated using postscript. Somewhat similarly, the XPS format provides such a fixed layout document, which is based on the eXtensible markup language (XML).

Thus, application content or other print data may be received from the application 112 in virtually any format, including, e.g., hypertext markup language (HTML), or in the format associated with document processing applications and/or images, or any of the formats referenced above. The format converter 136 may thus be configured to receive print data in these and any other various formats, and to convert the print data into a format that is recognizable by a designated printer.

Similarly, as referenced above, the format converter 136 may be configured to convert the print characteristics associated with the print job into a format that is recognizable by the designated printer 118. That is, as referenced above, the print characteristics may include aspects of how the print data should or can be printed; i.e., based on preferences of the user and/or (capabilities, or lack thereof) of the designated printer. The format converter 136 may thus provide appropriate conversion, depending on a selected printer and/or on preferences of the user. The format converter 136 may then provide and execute a resulting, converted print job using, e.g., a protocol referred to herein as the cloud print protocol (CPP). Thus, the cloud print protocol allows the cloud print service 102 to communicate with the cloud-aware printer 118 (or with a legacy printer enabled to communicate with the cloud print service 102).

The cloud print service 102 may include job storage 140 which may provide one or more types of data storage related to operations of the cloud print service 102. For example, the job storage 140 may store print jobs and related information, where such print jobs/information may be stored prior to and/or after the format conversions provided by the format converter 136. For example, a print job may be stored in a printer-independent format in which the print job may have been received by the job submit API 132.

Further in the example of the cloud print service 102 of FIG. 1, a print job router 138 may be configured to route the converted print job from the format converter 136 and/or the job storage 140 to a designated printer, e.g., the cloud-aware printer 118. The print job router 138 may further be configured to monitor and mediate execution and success/failure of a given print job. The print job router 138 may thus be responsible for managing and monitoring ongoing print jobs from a plurality of users, which may be designated for a corresponding plurality of printers, including the cloud-aware printer 118.

As shown, the print job router 138 may include or otherwise be associated with a job fetch API 142 and/or a job control API 143. For example, the job fetch API 142 may be configured to provide the print job to the cloud-aware printer 118, e.g., may be used by the cloud-aware printer 118 to fetch a desired print job. The job control API 143 may be responsible for authorizing the cloud-aware printer 118 as needed, and for receiving updated status information from the cloud-aware printer 118, e.g., whether the print job has completed or failed. Such status information also may be stored using the job storage 140, in association with the corresponding print job in question. The job control API 143 also may include status information including, e.g., whether a print job is currently queued by not yet downloaded to a corresponding printer, or spooled/downloaded and added to a native printer queue of the cloud-aware printer 118 (if applicable).

Furthermore, the print job router 138 may be configured to periodically check a status of a printer(s), using a corresponding print client such as print client 146. For example, the print job router 138 may be aware that the cloud-aware printer 118 is available, as long as the cloud-aware printer 118 is powered on at a given time.

As just referenced, the cloud-aware printer 118 may utilize various hardware/software components during normal printing operations. For example, during execution, the print job router 138 may be configured to communicate with, e.g., a print client 146 executing on firmware 144 of the cloud-aware printer 118. The print client 146 may communicate with the cloud print service 102, e.g., with the print job router 138, using the cloud print protocol referenced herein.

More specifically, the print client 146 may be configured to register the cloud-aware printer 118 with the cloud print service 102, and to thereby associate the thus-registered printer 118 with a user of the device 108. Moreover, the print client 146 may be configured to actually drive the cloud-aware printer 118 and thereby execute the desired printing.

In the example of FIG. 1, the cloud-aware printer 118 is illustrated as including the print client 146 within the firmware 144. The firmware 144, as would be appreciated by one of skill in the art, may represent factory installed hardware and/or software which provides designated functions without generally requiring or allowing user modification or configuration (e.g., may utilize read-only memory). Thus, the cloud-aware printer 118 may be preconfigured from before time of purchase to communicate and coordinate with the cloud print service 102, to thereby provide a convenient and enjoyable user experience.

For example, the cloud-aware printer 118 may include a network access manager 148, user input 150, and a display (or other user output) 152, which may generally represent otherwise-conventional components that are therefore not described here in detail except as may be needed to assist in understanding example operations of the system. Of course, the cloud-aware printer 118 need not include all of the components 144-152, and/or may include additional or alternative components, which are also not discussed here in detail.

In the example of FIG. 1, the network access manager 148 may represent associated hardware/software which enables a cloud-aware printer 118 to communicate over the network 106 with the cloud print service 102. For example, such communication may be conducted wirelessly if the cloud-aware printer 118 is within range of an appropriate wireless network. In other examples, the network access manager 148 may enable a wired connection of the cloud-aware printer 118 to the network 106, e.g., by way of connection to an appropriate router.

The user input 150 may represent virtually any sort of keypad, stylus, or other input technique for entering data to the cloud-aware printer 118. Similarly, the display 152 may represent virtually any sort of audio and/or video display to output information to the user 125 or other user of the cloud-aware printer 118.

It will be appreciated that many other configurations of the cloud-aware printer 118 or other printers are contemplated for use in conjunction with the system. For example, as referenced above, a legacy printer, not specifically illustrated in the example of FIG. 1, may lack some of the functionality of the cloud-aware printer 118. For example, such a legacy printer may not have the network access manager 148 and/or the firmware 144 which may be utilized to implement the print client 146 and otherwise communicate with the cloud print service 102. In such cases, the print client 146 may be configured to execute on or in conjunction with a computing device which is in communication with the legacy printer, and which has the available resources necessary to implement the functionalities described herein, and which may include an otherwise conventional printer driver communicating with the legacy printer in question. Other variations and implementations of the printer 118 or related printers would be apparent, and are not described here in detail, except as may be necessary or helpful in understanding operations of the roving printer scenarios described herein.

Figure 4A:
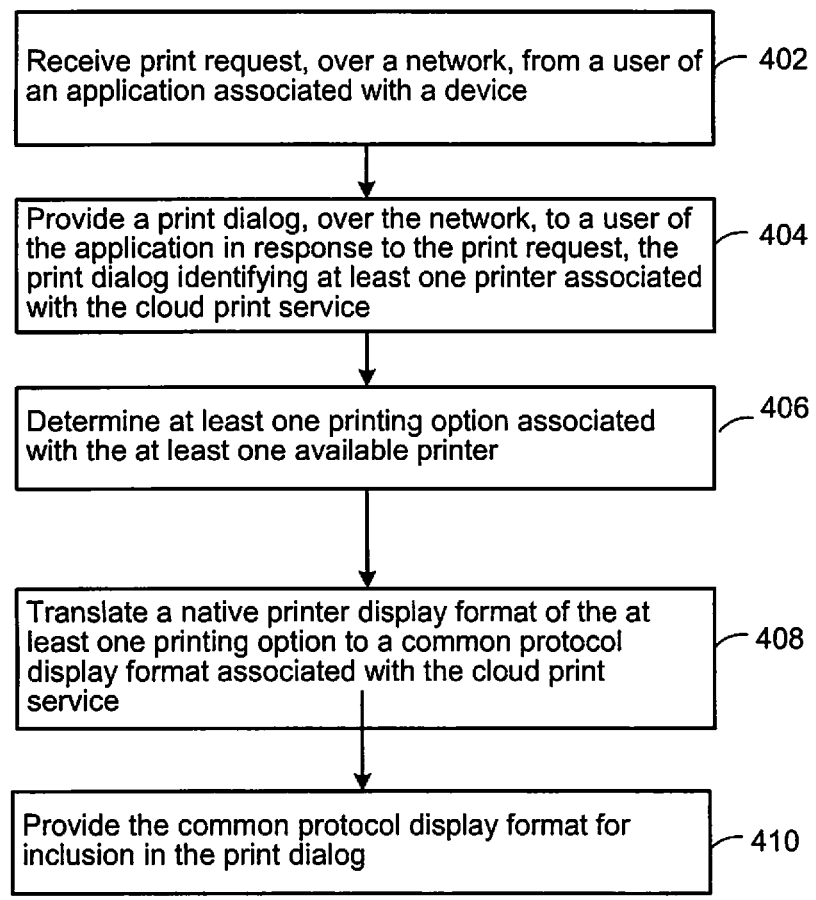
FIG. 4A is a flowchart illustrating example operations of the system of FIG. 1 according to an embodiment.

FIG. 4A is a flowchart 400A illustrating example operations 402-410 of the system of FIG. 1. Although the flowchart 400A of FIG. 4A illustrates the operations 402-410 in sequential order, it will be appreciated that this is merely an example, and that additional or alternative operations may be included. Further, operations of FIG. 4A and related operations may be executed in a different order than that shown, or in a parallel or overlapping fashion.

A print request may be received over a network from a user of an application associated with a device (402). For example, the application manager 128 may receive the print preview over the network 106 from a user of the application 112 associated with the device 108.

A print dialog may be provided over the network to the user of the application in response to the print request (404). For example, the application manager 128 may provide the print dialog 113, over the network 106, to the user of the application 112 in response to the print request. The print dialog 113 may include a list of printers 113A associated with the cloud print service 102. For example, as explained above, the user may be registered to use the cloud print service 102, and the user information may be stored in the database 127b of registered users. The user account of the user may be associated with a number of registered printers including the cloud aware printer 118 and/or the legacy printer. The application manager 128 may determine which of the registered cloud aware printers are currently available, and provide the list of available printers in the printer list 113A.

One or more printing options associated with each of the available printers in the printer list may be determined (406). For example, the options translator 133 may determine the printer options from the capability files in the capability information database 134. The capability information database 134 may include a number of capability files, where each capability file corresponds to a different cloud-aware printer 118. Each capability file includes information describing the capabilities of a respective printer. Each capability may be identified by a capability name, which corresponds to the fixed capability name provided by the standard such as XPS or PPD. Further, the capability file may specify the printing options associated with the capabilities. The capability file also includes the display name of the capability name, as well as the display of the printing options associated with each capability name. The information related to the display format of the printing options may be considered the native printer display format, which is defined by each respective vender. The options translator 133 may determine the printing options associated with each printer based on the capability files included in the capability information database 134. For example, the options translator may locate one or more capability names from the capability files in the capability information database 134.

A native printer display format of the printing options may be translated to a common protocol display format associated with the cloud print service (408). For example, the options translator 133 may translate the native printer display format of the printing options into the common protocol display format associated with the cloud print service 102. As indicated above, referring to FIG. 2, the capability files include the display names 210 of the capabilities, and the display names 220-1, 220-2 of the printing options 215-1, 215-2, which is in the native printer display format. In other words, the display name 210 of the capability and the display names 220-1, 220-2 of the printing options 215-1, 215-2 are defined by the particular vendor of the printer associated with capability files. According to an embodiment, the options translator 133 may disregard the native printer display format of the capability (e.g., the display name 210 of the capability and the display names 220-1, 220-2 of the printing options 215-1, 215-2), and may obtain a common protocol display format for the capability name 205 for inclusion in the print dialog 113 from a translation database 135.

For example, within the translation database 135, the options translator 133 may select the common protocol display format associated with the cloud print service 102 based on the capabilities names. For instance, the translation database 135 may include a plurality of entries corresponding to the capabilities names. The corresponding common protocol display format may be associated with each respective capability name. Further, the common protocol display format for a respective capability name may be provided in a number of different languages. As such, the translation database 135 may determine a language associated with user (e.g., from the user account, or browser information such as the IP address associated with print request), and select the appropriate common protocol display format corresponding to the capability name and the determined language.

The common protocol display format may be provided for inclusion in the print dialog (410). For example, the options translator 133 may provide the printing options for each available printer in the printer list 113B according to the common protocol display format. As a result, the user is presented with a uniform printing option selection menu that is relatively more user-friendly and intuitive.

Figure 4B:
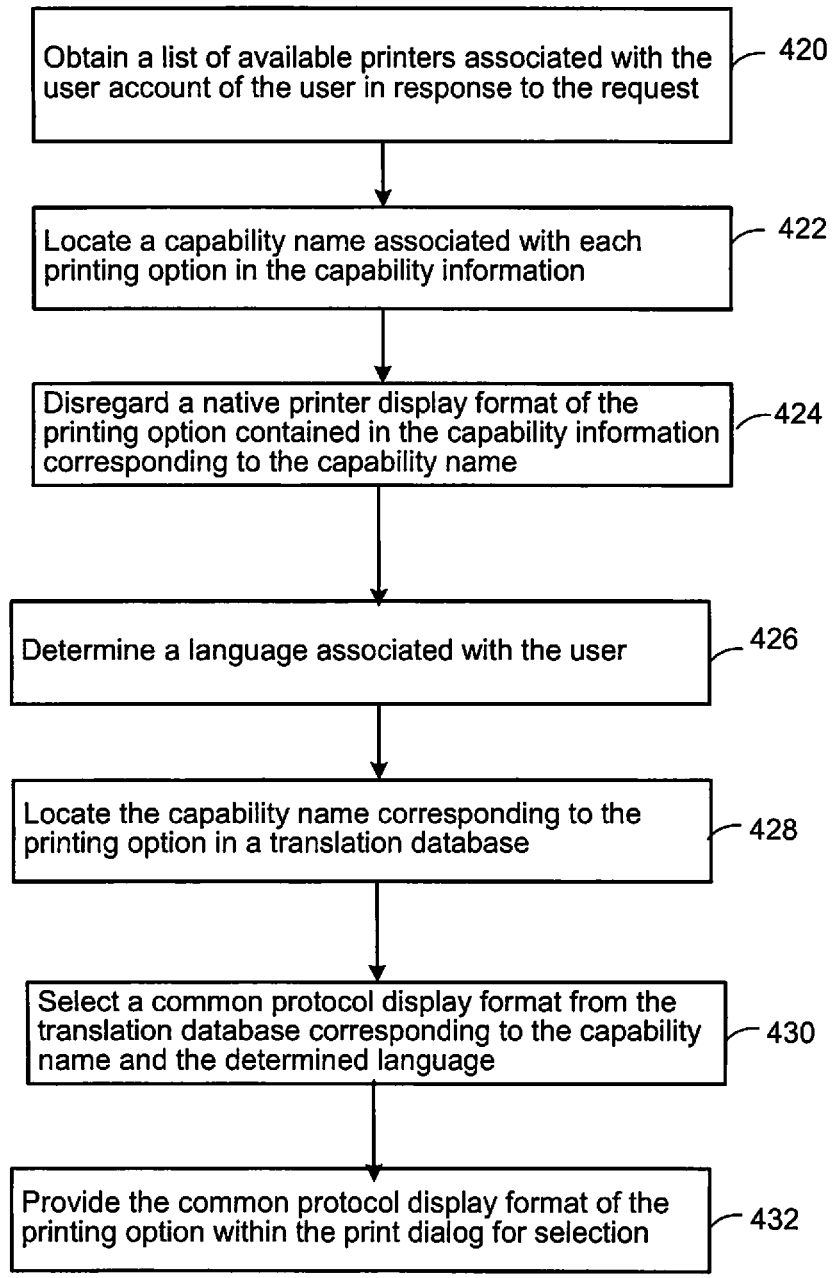
FIG. 4B is a flowchart illustrating example operations of the system of FIG. 1 according to another embodiment.

FIG. 4B is a flowchart 400B illustrating example operations 420-432 of the system of FIG. 1. Although the flowchart 400B of FIG. 4B illustrates the operations 420-432 in sequential order, it will be appreciated that this is merely an example, and that additional or alternative operations may be included. Further, operations of FIG. 4B and related operations may be executed in a different order than that shown, or in a parallel or overlapping fashion.

A list of available printers associated with the user account of the user may be obtained in response to the print request (420). For example, the application manager 128 and/or the options translator 133 may obtain the list of available printers associated with the user account of the user of the application 112 associated with the device 108. The application manager 128 and/or the options translator 133 may obtain the list of printers from the database 127b of registered users, and determine which of the printers are currently available to the user.

A capability name associated with each printing option may be located in the capability information (422). For example, the options translator 133 may locate the capabilities of each of the available registered cloud aware printers 118 by searching the capability names of the capability files in the capability information database 134.

A native printer display format of the printing options contained in the capability information may be disregarded (422). For example, the options translator 133 may disregard the native printer display format for the printing options, as explained above.

A language associated with the user may be determined (426), the capability names corresponding to the printing options may be located in a translation database (428), and a common protocol display format may be selected from the translation database according to the capability names and the determined language (430). For example, the options translator 133 may determine the language associated with the user based on the user's account and/or an IP address associated with the print request. The options translator 133 may locate the appropriate capability names in the translation database 135, and select the common protocol display format according to the capability names and the determined language. In one example, if it is determined that a first printer has a page resolution capability, the options translator 133 may search the translation database 135 for the entry identified by the page resolution capability name, and select the common protocol display format in the determined language.

The common protocol display format of the printing options is provided for inclusion in the print dialog (432). For example, the options translator 133 may provide the common protocol display format to the application manager 128, which transmits the print dialog 113 having the printing options in the common protocol display format.

Many other examples and variations of the systems and operations of FIGS. 1 to 4 would be apparent to one skilled in the art. For example, instead of printing to a hardware printer, the system may be used to print to PDF or other software format.

Figure 5:
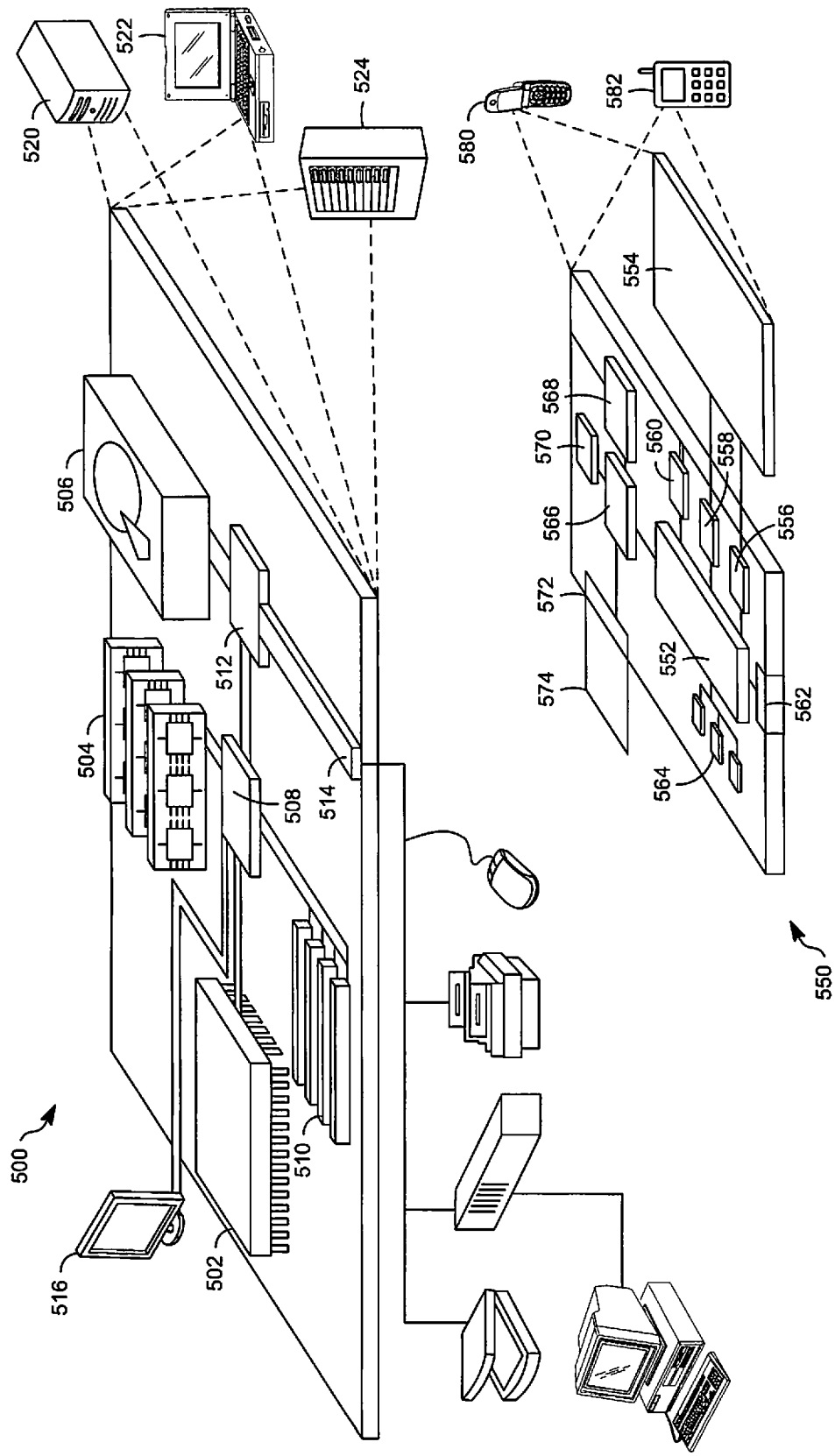
FIG. 5 is a block diagram showing example or representative computing devices and associated elements that may be used to implement the systems and methods of FIGS. 1-4.

FIG. 5 is a block diagram showing example or representative computing devices and associated elements that may be used to implement the systems of FIGS. 1 and 3. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A print server including a cloud print service, comprising:

at least one processor;

a non-transitory computer-readable storage medium including instructions executable by the at least one processor, the instructions configured to implement, an application manager configured to receive a print request for content to be printed, over a network, from a user of an application associated with a device, and provide, over the network, a print dialog to the user, the print dialog configured to identify at least one available printer among a plurality of printers associated with the cloud print service; and an options translator configured to determine at least one printing option associated with the at least one available printer, and translate a native printer display format of the at least one printing option to a common protocol display format associated with the cloud print service, the options translator being configured to provide the common protocol display format for inclusion in the print dialog, the native printer display format being an original display format for the at least one printing option that is provided by printer capability information specific to the at least one available printer, the common protocol display format being a display format for the at least one printing option associated with the cloud print service such that the common protocol display format is the same across the plurality of printers associated with the cloud print service.

2. The print server of claim 1, wherein the options translator configured to determine at least one printing option includes determining the at least one printing option from the printer capability information associated with the at least one available printer in response to receipt of the print request.

3. The print server of claim 2,
wherein the options translator configured to determine at least one printing option associated with the at least one available printer includes,
locating a capability name corresponding to the at least one printing option from the printer capability information,
wherein the option translator configured to translate a native printer display format of the at least one printing option to a common protocol display format associated with the cloud print service includes,
disregarding the native print display format of the at least one printing option contained in the printer capability information; and
selecting the common protocol display format associated with the cloud print service from a translation database based on the capability name.

4. The print server of claim 1, further comprising:
a printer searcher configured to search a plurality of available printers associated with a user account of the user that is associated with the cloud print service based on print search criteria, and configured to select at least a subset of available printers among the plurality of available printers associated with the user account,
wherein the options translator is configured to translate the native printer display format of the at least one printing option for at least one printer among the selected subset to the common protocol display format associated with the cloud print service.

5. The print server of claim 1, wherein the options translator configured to translate a native printer display format of the at least one printing option to a common protocol display format associated with the cloud print service includes:
locating a capability name corresponding to the at least one printing option in a translation database; and
selecting the common protocol display format from the translation database corresponding to the capability name.

6. The print server of claim 1, wherein the options translator configured to translate a native printer display format of the at least one printing option to a common protocol display format associated with the cloud print service further includes:
providing the common protocol display format in a language associated with the user.

7. The print server of claim 6, wherein the providing the common protocol display format in a language associated with the user includes:

determining the language associated with the user;
locating a capability name corresponding to the at least one printing option in a translation database; and
selecting the language of the common protocol display format from the translation database based on the determined language.

8. The print server of claim 7, wherein the determining the language associated with the user includes determining the language based on a user account of the user associated with the cloud print service.

9. The print server of claim 7, wherein determining the language associated with the user includes determining the language based on an internet protocol (IP) address associated with the request.

10. The print server of claim 1, further comprising:
a print preview generator configured to access the content in response to the print request and generate a print preview providing at least a portion of the content displayed in accordance with the at least one printing option having the common protocol display format,
the print preview generator configured to provide the print preview along with the at least one printing option having the common protocol display format for inclusion in the print dialog.

11. The print server of claim 1, wherein the printer capability information specifies printing options for the at least one available printer, and for each printing option, the printer capability information specifies the native printer display format of a respective printing option.

12. A method of translating printing options into a common protocol display format performed by one or more processors, the method comprising:
receiving a print request for content to be printed, over a network, from a user of an application associated with a device;
providing, over the network, a print dialog to the user, the print dialog configured to identify at least one available printer among a plurality of printers associated with the cloud print service;
determining at least one printing option associated with the at least one available printer;
translating a native printer display format of the at least one printing option to the common protocol display format associated with the cloud print service, the native printer display format being an original display format for the at least one printing option that is provided by printer capability information specific to the at least one available printer, the common protocol display format being a display format for the at least one printing option associated with the cloud print service such that the common protocol display format is the same across the plurality of printers associated with the cloud print service; and
providing the common protocol display format for inclusion in the print dialog.

13. The method of claim 12, wherein determining at least one printing option associated with the at least one available printer includes:
determining the at least one printing option from the printer capability information associated with the at least one available printer in response to receipt of the print request.

14. The method of claim 13,
wherein determining at least one printing option associated with the at least one available printer includes,
locating a capability name corresponding to the at least one printing option from the printer capability information, wherein translating a native printer display format of the at least one printing option to the common protocol display format associated with the cloud print service includes, disregarding the native print display format of the at least one printing option contained in the printer capability information; and selecting the common protocol display format associated with the cloud print service from a translation database based on the capability name.

15. The method of claim 12, wherein translating a native printer display format of the at least one printing option to the common protocol display format associated with the cloud print service further includes:

providing the common protocol display format in a language associated with the user.

16. The method of claim 15, wherein the providing the common protocol display format in a language associated with the user includes:

determining the language associated with the user;

locating a capability name corresponding to the at least one printing option in a translation database; and selecting the language of the common protocol display format from the translation database based on the determined language.

17. A computer program product tangibly embodied on a non-transitory computer-readable storage medium and including executable code that, when executed, is configured to cause a data processing apparatus to:

receive a print request for content to be printed, over a network, from a user of an application associated with a device;

provide, over the network, a print dialog to the user, the print dialog configured to identify at least one available printer among a plurality of printers associated with the cloud print service;

determine at least one printing option associated with the at least one available printer;

translate a native printer display format of the at least one printing option to the common protocol display format associated with the cloud print service, the native printer display format being an original display format for the at least one printing option that is provided by printer capability information specific to the at least one available printer, the common protocol display format being a display format for the at least one printing option associated with the cloud print service such that the common protocol display format is the same across the plurality of printers associated with the cloud print service; and provide the common protocol display format for inclusion in the print dialog.

18. The computer program product of claim 17, wherein the executable code that, when executed, is configured to cause a data processing apparatus to:

determine the at least one printing option from the printer capability information associated with the at least one available printer in response to receipt of the print request.

19. The computer program product of claim 18, wherein the executable code that, when executed, is configured to cause a data processing apparatus to:

locate a capability name corresponding to the at least one printing option from the printer capability information;

disregard the native print display format of the at least one printing option contained in the printer capability information; and select the common protocol display format associated with the cloud print service from a translation database based on the capability name.

* * * * *